United States Patent [19]

Knobel et al.

[11] 4,281,747

[45] Aug. 4, 1981

[54] OVERRIDE LOCK ASSEMBLY FOR A DRIVING MEANS

[75] Inventors: Fritz Knobel, Ennenda; Gerhard Kuhn, Glarus, both of Switzerland

[73] Assignee: Ortopedia GmbH, Kiel, Fed. Rep. of Germany

[21] Appl. No.: 956,991

[22] Filed: Oct. 31, 1978

[30] Foreign Application Priority Data

Nov. 4, 1977 [CH] Switzerland .................. 13472/77

[51] Int. Cl.³ .............................................. B60T 7/12
[52] U.S. Cl. ................................................... 192/8 C
[58] Field of Search .............. 192/20, 21, 12 BA, 8 C, 192/8 R, 7

[56] References Cited

U.S. PATENT DOCUMENTS

| | | | |
|---|---|---|---|
| 1,629,277 | 5/1927 | Koeb | 192/8 C |
| 1,687,238 | 10/1928 | Costello | 192/8 C |
| 2,509,541 | 5/1950 | Suska | 192/8 R |
| 3,319,747 | 5/1967 | Lauper | 192/8 R |

Primary Examiner—George H. Krizmanich
Attorney, Agent, or Firm—Haseltine and Lake

[57] ABSTRACT

An override lock assembly comprises a driven element and a driving element both rotatably arranged on a common fixed shaft.

Between the two elements there is arranged a clamping member engaging into both elements. If the two elements rotate with different speeds one of the elements engages with an entraining member into said clamping element and acts upon said clamping element such that it deforms or gets shifted such to frictionally engage into said fixed shaft thus generating a friction force therebetween which decelerates the rotating element.

2 Claims, 6 Drawing Figures

OVERRIDE LOCK ASSEMBLY FOR A DRIVING MEANS

BACKGROUND OF THE INVENTION

1. Field of the Invention

The present invention an override lock assembly for a driving means, comprising a driving element means and a driven element means including each an unmovably thereto arranged entraining means and being rotatably arranged side by side on a common fixed shaft means. Furthermore, the invention relates further to an override lock assembly in combination with a vehicle provided with separately driven driving wheels.

2. Description of the Prior Art

Presently, there are known a wide variety of rotation block devices, free running drives and overrunning couplings which allow free rotation in the one direction and block the rotation in the opposite direction. However, there exists no such device which is arranged to operate in both rotative directions.

SUMMARY OF THE INVENTION

Hence, it is a general object of the invention to provide an improved override lock assembly which is operative in both rotative directions and successively prevents an overtaking of the driven element by the driving element by means of executing a braking force.

A further object is to provide an override lock assembly comprising a coiled coupling spring means wound around a fixed shaft means and arranged between a driving element means which coiled spring means comprise bent end sections extending laterally of said coiled spring and forming integral leg means, whereby said driving element means and said driven element means comprise each an entrainment means and said entrainment means of said driven element means extends between said two leg means and said entrainment means of said driving element means extends over said leg means and said driven element entraining means, such that upon a synchronous relative movement of said driving element means and said driven element means said coiled spring means moves freely together with such movement and whereupon an unsynchronous relative movement of said driving element means and said driven element means said coiled spring means is positively pulled towards said fixed shaft means such to brake and decelerate said driving element means.

Yet a further object of the invention is to provide an override lock assembly for a driving element means comprising a driven element means and a driving element means provided each with an entrainment means fixedly mounted thereto, whereby said driving element means and said driving element means are rotatably mounted on a common fixed shaft; whereby said entrainment means of said driven element means comprises a cylindrical inner surface portion by the agency of which said driven element means is seated on said fixed shaft means, whereby said entraining means comprises a gap including chamfered end surfaces such that an outer surface portion of said shaft means remains freely exposed, further whereby said entraining means of said driven element means being arranged over said entraining means of said driving element means on said shaft means and is provided with at least two recesses defining back a rotation stop and an abutment means, and whereby there are provided at least two entrainment member means arranged within the space defined by said exposed surface portion of said shaft and said recesses, whereby upon a synchronous relative movement of said driving element means and said driven element means said entrainment means is urged against said rotation stop and upon an unsynchronous relative movement of said driving element means and said driven element means said entraining means is urged against said abutment means such to brake and decelerate said driving element means.

Yet a further object of the invention is to provide in both directions acting overriding brake or clutch in combination with a wheelchair.

BRIEF DESCRIPTION OF THE DRAWINGS

The present invention will be more fully understood by the reference to the following detailed description thereof, when reading in conjunction with the attached drawings, wherein.

DETAILED DESCRIPTION OF THE PREFERRED EMBODIMENTS

Figure 2:
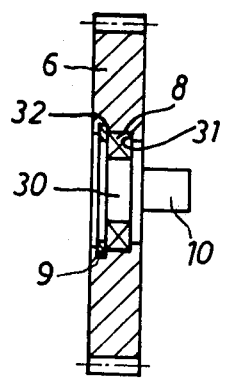
FIGS. 2,5,6 are views of the main portions of the override lock assembly shown in FIG. 1, shown in an axially exploded arrangement.
Figure 5:
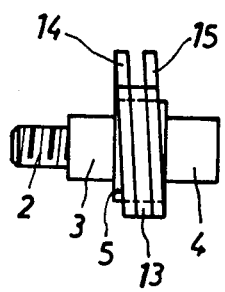
Figure 6:
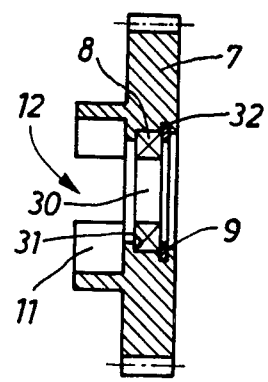
Figure 3:
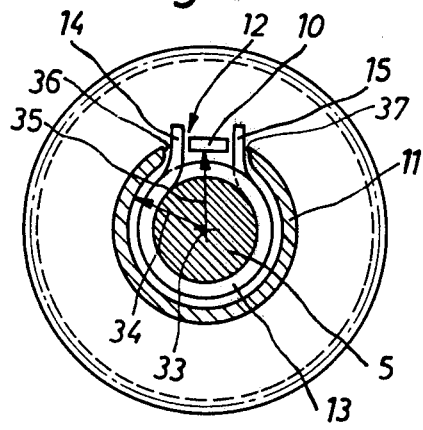
FIG. 3 is a section along line III—III of FIG. 1.

In FIGS. 1,3,5,6 there is shown a preferred embodiment of the inventive override lock assembly for a driving means. There is shown specifically in FIG. 1 a shaft 1 having at one end a coaxially extending threaded stud 2 which is arranged to be threadingly received in a counter part not particularly shown of a driving means. As specifically shown in FIG. 5 said shaft 1 comprises two sections 3,4 having an identical length and diameter. Between said sections 3,4 there is arranged an intermediate section 5 having a larger diameter than the two adjoining sections 3,4 (see FIGS. 1 and 2). A driven wheel 6 is mounted onto section 3 and a driving wheel 7 (FIGS. 1 and 6) is mounted onto section 4. Both wheels 6,7 are toothed gear wheels and mounted onto their respective shaft sections 3,4 by means of a frictionless bearing 8 such as shown in FIGS. 2 and 6 which in the present preferred embodiment is a ball bearing. The ball bearings 8 are set into a through bore 30 arranged in gear wheel 6,7, which through bore has a stepped section forming a shoulder 31 against which the respective ball bearings 8 rest upon by means of their outer races (not particularly shown). The through bores 30 comprise further an inner circumferential groove 32. A circlip lock ring 9 each commonly known as Seegerring is inserted in its respective circumferential groove 32 such that the ball bearings 8 are securely held in the through bores 30 of the respective gear wheels 6,2. The driven wheel 6 is provided at one side thereof a laterally extending plate-like section 10 extending parallel to shaft 1 but at a radial distance from its longitudinal centerline 33 such as exemplarily shown in FIG. 3. This plate-like section 10 acts as entrainment means or engaging means of driven wheel 6. The driving wheel 7 is provided at one side thereof with a section 11, see FIGS. 3 and 6, which section 11 extends coaxially to the above mentioned centerline 33 and acts as entrainment means or engaging means of driving wheel 7. The length of the inner radius 34 of the section corresponds to the distance of the laterally extending plate-like entrainment section 10 of wheel 6 from the centerline 33. The annular section 11 comprises a clearance or gap 12. Furthermore, there is provided a coiled spring 13 which is a bar of rectangular cross section wound around intermediate section 5 defining a coiled spring clutch as known in the art. The respective end portions 14, 15 of said coiled spring are formed as legs projecting from the spring 13 such as shown in FIG. 3. Said legs 14, 15 extend parallel to and at a distance from each other.

Figure 1:
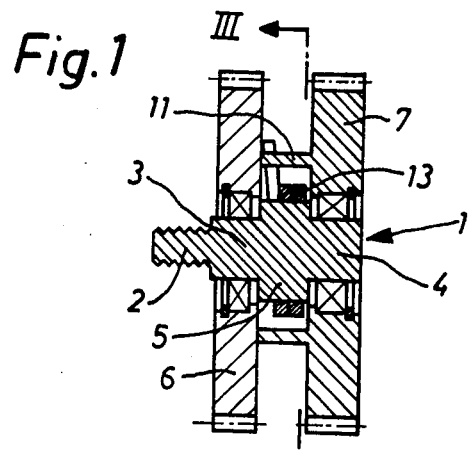
FIG. 1 is an axial section of a preferred embodiment of the inventive override lock assembly.

Reference is now made specifically to FIG. 1. Coiled spring 13 is mounted on the intermediate section 5 of shaft 1 and is wound several times around said section 5. The driven wheel 6 is mounted on section 3 of the shaft 1 such that the entrainment plate 10 of the driven wheel 6 drivingly enters between said parallel extending legs 14,15 of the coiled entrainment spring 13, see also FIG. 3. The driving wheel 7 is mounted onto the other section 4 of the shaft 1 such that the legs 14,15 of spring 11 enter into the space or opening 12 formed in said annular entrainment section 11 of said driving wheel 7.

The gear wheels 6,7 are axially secured on the respective sections 3,4 of shaft 1 by above mentioned Seegerrings 9 extending into mentioned inner circumferential grooves 32.

The operation of the override lock assembly is as follows. As soon as a torque is applied, one of the legs 14,15 of the entrainment spring 13 will be shifted by the entrainment plate 10 of the driving wheel 6 such that the distance between said legs 14,15 increases and one of said legs 14,15, depending from the rotational direction of said applied torque, will be urged against one of the end faces 36,37 of the annular ring 11 defining gap 12 therebetween and accordingly driven wheel 6 will be rotated in one or the other direction in accordance with the rotational direction of said torque. Now as soon as the rotational speed of the driving wheel 6 is suddenly changed, the corresponding face or edge 36,37 of the entrainment ring 11 of the driven wheel 6 will be urged against the outside surface of the corresponding leg 14 or 15 of spring 13. Conclusively, the inner diameter of the coiled entrainment spring 13 will decrease and frictionally engage intermediate section 5 of shaft 1 and such that the gyrating mass of the driver is decelerated or braked.

Above preferred embodiment of the invention is described as comprising a gear wheel drive. It must be however understood that such drive must not necessarily comprise a toothed gear wheel arrangement. It may as well in a further embodiment comprise a belt drive incorporating pulleys.

Figure 4:
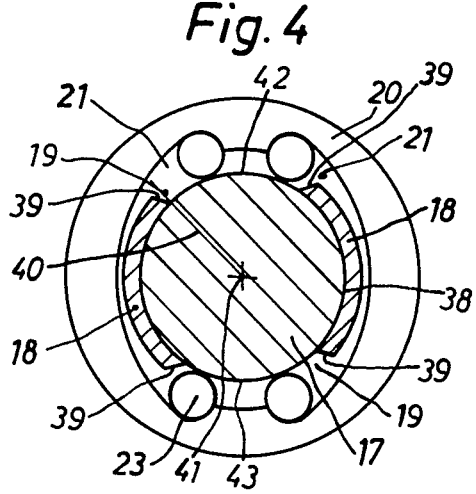
FIG. 4 is a section through a further embodiment of the inventive override lock.

A further preferred embodiment is shown in FIG. 4. A fixed shaft 17 carries a not specifically shown driving means, the entrainment member 18 of which being seated by the agency of its cylindrical inner surface 38 on said shaft 17. This entrainment member 18 comprises two gaps 19 arranged diametrically opposed to each other, whereby the end faces 39 of the member 18 defining said gaps 19 is chamfered such that the planes defined by said end faces 19 define an acute angle with the respective radius line 40 extending through the center 41 of shaft 17, such that two outer surface portions 42,43 of shaft 17 are exposed.

An annular member 20 is arranged surrounding the entrainment member 18 of the driving means, which annular member 20 forms the entrainment member of a driven member not particularly shown. This entrainment member 20 comprises at its inner circumferential surface two each recesses 21 extending parallel to the centerline 41 of shaft 17. These recesses 21 act as rotational stops and abutment flanks. The respective recesses are formed mirror symmetrically to each other. In each of the free spaces defined by the exposed surface portions 42,43, the end faces of the entrainment member 18 and the recesses 21 there is arranged one roller 23 abutting against its respective rotational abutment. Each said rollers is secured axially of the shaft 17 by commonly known means not particularly shown.

This embodiment of the override lock arrangement operates as follows. Due to the rotation of the driven element the entrainment elements 18 will move such that the respective chamfered faces 39 abut the respective rollers 23. Conclusively, the rollers 23 will be slightly lifted off the outer circumferential surface portions 42,43 of the shaft 17 and forcibly urged against the corresponding rotation stop defined by the recesses 21. Accordingly there is formed a force locked connection between the two entrainment members 18,20 and thus the driving member rotates at the same speed of the driven member.

Now, if the rotational speed of the driving means (driving the driven member) is reduced, the rollers 23 will positively be urged against the corresponding abutment faces and consequently the driving member will be braked, e.g. i.e. decelerated.

The rollers 23 of the above described embodiment operate as entraining members. It is however possible as well to use in further embodiments balls instead of the rollers. In such case the override lock assembly can be mounted within the hub of the driving member.

The above described preferred embodiments of the invention can be mounted by example in vehicles having every wheel separately driven and thus applied for steering such vehicle. Thereby every wheel drive is provided with such override lock assembly arranged between the vehicle driving portion and the wheel of such vehicle. By means of controlling the rotative speed of the driving portion a steering of the vehicle will be attained. A further advantageous application of the inventive override lock assembly is its arrangement in an electrically driven wheelchair for invalid persons.

Since many modifications, variations and changes in detail may be made to the described embodiments, it is intended that all matter contained in the foregoing description or shown in the accompanying drawings be interpreted as illustrative and not in a limiting sense.

ACCORDINGLY,

What is claimed is

1. In an override lock assembly for a driving means, comprising a driving element means and a driven element means each including an unmovably arranged entraining means and being rotatably arranged side by side on a common fixed shaft means, an improvement comprising: a coiled coupling spring means wound around said shaft means being arranged between said driving element means comprises bent end sections extending laterally of said coiled spring and forming integral leg means, whereby said entrainment means of said driven element means, extends between said leg means and said entrainment means of said driving element means overlaps said leg means such that, upon a synchronous relative movement of said driving element means and said driver element means, said coiled spring means moves freely together with such movement and said coiled spring means is positively positioned towards said fixed shaft means to thereby brake and decelerate said driving element means in response to unsynchronous movement between said driven element means and said driving element means.

2. The improvement of claim 1, whereby said coiled spring means comprises: a plurality of mutually abutting windings and whereby said laterally leg extending leg means of said coiled spring means extend parallel to each other.

* * * * *